Patented Feb. 21, 1939

2,148,378

UNITED STATES PATENT OFFICE 2,148,378

CATALYSTS

Boris Malishev, Elizabeth, N. J.

No Drawing. Application May 3, 1938,
Serial No. 205,724

4 Claims. (Cl. 23—233)

My invention relates to catalysts and has particular reference to catalysts for refining, synthesizing and polymerizing hydrocarbons. This is a continuation in part of my patent application Serial No. 140,441, filed May 3, 1937.

In my application Serial No. 140,441, filed May 3, 1937, and application Serial No. 194,769, filed March 9, 1938, I described methods of preparation of a catalyst by calcining a mixture of sulfuric acid, sulfuric acid anhydride, sludge acid, or, generally speaking, of a substance having acid reaction in its aqueous solution due to sulfuric acid, at a temperature from 245° C. to red heat with a phosphate compound, such as phosphate rock, apatite, monazite, vivianite, wavelite, bone-ash, Thomas slag (finely powdered basic slag obtained by Thomas method of making steel), etc., these substances being mixed with diatomaceous earth or similar siliceous adsorbing materials. The quantity of sulfuric acid or its equivalents must be, of course, sufficient for the complete decomposition of the mineral (or similar) phosphate, as described in my foregoing applications. The sulfuric acid is largely removed by the calcination at high temperatures used in my process.

I have found, however, that with my process of preparation of a catalyst from mineral phosphates, it is not necessary to add kieselguhr or similar adsorbent siliceous materials, because the phosphate minerals contain admixtures, especially silicium and calcium compounds, also iron and aluminum silicates which after calcination form calcium and other complex metal silicates and calcium sulfate. These compounds produce with water or steam a hard porous mass (cement and gypsum) and are, therefore, necessary for briqueting or slabbing the product, taking place of an adsorbing material such as kieselguhr. With my catalyst, therefore, the admixture of adsorbing materials is not necessary unless the mineral phosphate lacks sufficient amount of cement forming compounds, in which case gypsum or cement may be added to the calcined mass.

I have also found that these admixtures materially enhance the catalytic activity of the product, which represents a combination of phosphoric anhydride with metal silicates or neutral sulfates, or meta phosphoric acid with the same silicates and sulfates, as follows:

The silicate ($SiO_2$) in this case, originally present as impurities, will form a silicate which will also act as catalysts, increasing the activity of the product.

Calcium sulfate in the product will act as a catalyst itself and will also serve as an adsorbent material in place of diatomaceous earth. Calcium silicate and silicates of the cement type are present in the mineral phosphate as impurities:

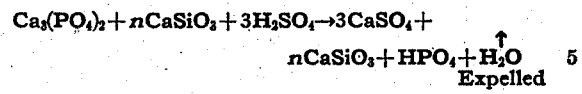

The catalytic activity in this case is due to the combination of meta phosphoric acid with calcium silicate (an impurity of phosphate minerals) and calcium sulfate, the latter admixtures also replacing diatomaceous earth.

In the final product a part of $P_2O_5$, probably, is converted into a non-volatile isomeric modification ($P_2O_5$) and forms a double anhydride with $SiO_2$ which is non-volatile.

The briqueting or slabbing of the product is also facilitated by the formation of phosphoric anhydride when the mass is calcined with sulfuric anhydride, this substance having binding properties, sufficient to permit briqueting the mass. This phosphoric anhydride forms the most active catalyst but its lifetime due to polymerization of $P_2O_5$ is rather short so that the catalyst should be treated with steam if an acid catalyst with a longer lifetime is preferred.

By adding water to the calcined mixture, cement is formed with the cement-forming materials, so that the mass can be shaped into briquets or slabs during the process of catalysis. The water of the cement and gypsum becomes liberated and converts the metaphosphoric acid, $HPO_3$, into the more active phosphoric acid $H_2PO_4$. Such decomposition of cement is desirable to supply water in status nacendi for hydration of the acids and steam, or water must therefore be continuously added to the reaction mixture during catalysis.

I claim as my invention:

1. A catalyst comprising the product of a mixture of a substance taken from the group consisting of a mineral phosphate and Thomas slag, with a substance taken from the group consisting of sulfuric acid, sulfuric acid anhydride, and sludge acid, the free sulfuric acid being largely expelled by calcination at a temperature below red heat.

2. A catalyst comprising the product of a mixture of a substance taken from the group consisting of a mineral phosphate and Thomas slag, with a substance taken from the group consisting of sulfuric acid, sulfuric acid anhydride, and sludge acid, the mixture being calcined at a temperature sufficient to cause the first substance to be decomposed by the second substance and the free sulfuric acid to be largely expelled, but below red heat.

3. A catalyst comprising the product of a mixture of a substance taken from the group consisting of a mineral phosphate and Thomas slag, with a substance taken from the group consisting of sulfuric acid, sulfuric acid anhydride, and sludge acid, the mixture being calcined at a temperature sufficient to cause the first substance to be decomposed by the second substance and the free sulfuric acid to be expelled, but below red heat, the product being hydrated for cementing together particles of the catalyst by the cement formed by calcination from the ingredients naturally present in the first substance.

4. A step in the process of preparation of a catalyst, consisting in mixing together a substance taken from the group consisting of a mineral phosphate and Thomas slag, with a substance taken from the group consisting of sulfuric acid, sulfuric acid anhydride, and sludge acid, and calcining the mixture at a temperature sufficient to decompose the first substance by the second substance and to expell the free sulfuric acid, the quantity of the second substance being sufficient for decomposition of the first substance.

BORIS MALISHEV.